United States Patent
Sunaga

(10) Patent No.: US 9,851,907 B2
(45) Date of Patent: Dec. 26, 2017

(54) CONTROL DEVICE, STORAGE SYSTEM, AND METHOD OF CONTROLLING A PLURALITY OF STORAGE DEVICES

(71) Applicant: FUJITSU LIMITED, Kawasaki-shi (JP)

(72) Inventor: Kazuyuki Sunaga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 15/041,812

(22) Filed: Feb. 11, 2016

(65) Prior Publication Data
US 2016/0239226 A1 Aug. 18, 2016

(30) Foreign Application Priority Data

Feb. 13, 2015 (JP) ................................. 2015-026185

(51) Int. Cl.
G06F 12/00 (2006.01)
G06F 3/06 (2006.01)

(52) U.S. Cl.
CPC .......... *G06F 3/0617* (2013.01); *G06F 3/0647* (2013.01); *G06F 3/0683* (2013.01)

(58) Field of Classification Search
CPC .... G06F 3/0617; G06F 3/0647; G06F 3/0683; G06F 12/00

USPC .......................................... 711/100, 154, 165
See application file for complete search history.

(56) References Cited

U.S. PATENT DOCUMENTS

| | | | |
|---|---|---|---|
| 6,356,660 B1 * | 3/2002 | Shannon | G06T 9/00 382/232 |
| 2008/0082591 A1 * | 4/2008 | Ahal | G06F 11/1471 |
| 2013/0046945 A1 | 2/2013 | Abe et al. | |

FOREIGN PATENT DOCUMENTS

| | | |
|---|---|---|
| JP | 2013-041394 A | 2/2013 |
| JP | 2013-206151 A | 10/2013 |

* cited by examiner

*Primary Examiner* — Tuan Thai
(74) *Attorney, Agent, or Firm* — Oblon, McClelland, Maier & Neustadt, L.L.P.

(57) ABSTRACT

A control device includes a processor configured to migrate data in a first partial storage area of a first storage device to a second partial storage area of a third storage device, change an access destination of access to the first partial storage area to the second partial storage area, control a writing of a first part of first data into a remaining partial storage area other than the first partial storage area of the first storage device, control a writing of a second part of the first data into the second partial storage area of the third storage device, and control a writing of at least a third part of second data into a second storage device, wherein a data volume of the first part of the first data is different from a data volume of the third part of the second data.

15 Claims, 11 Drawing Sheets

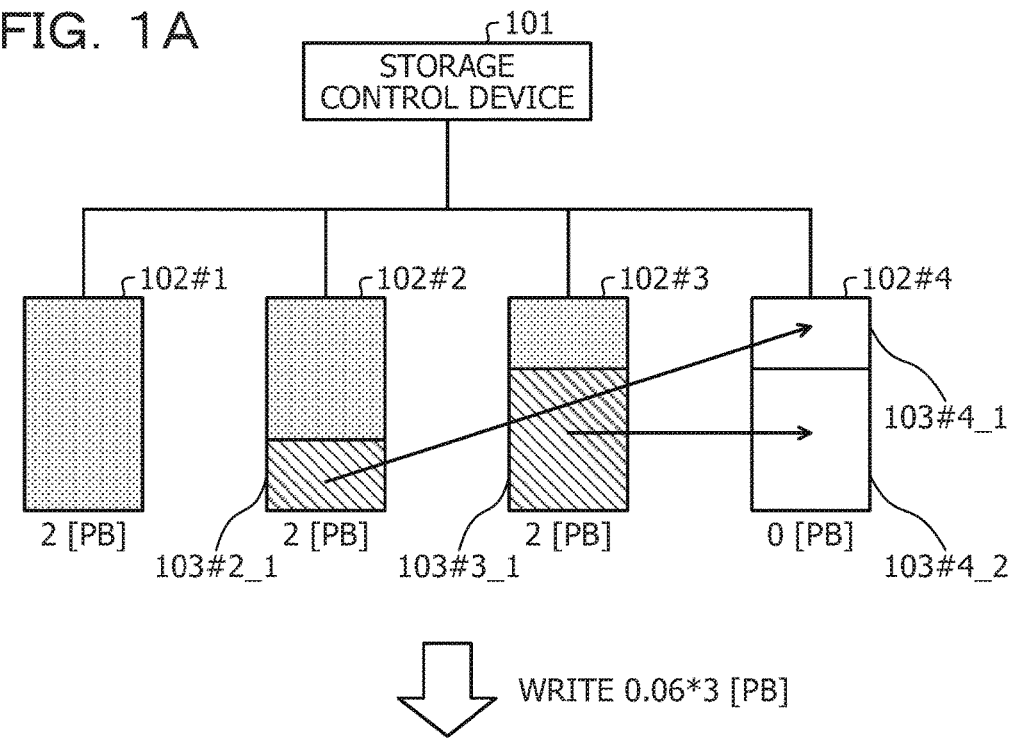
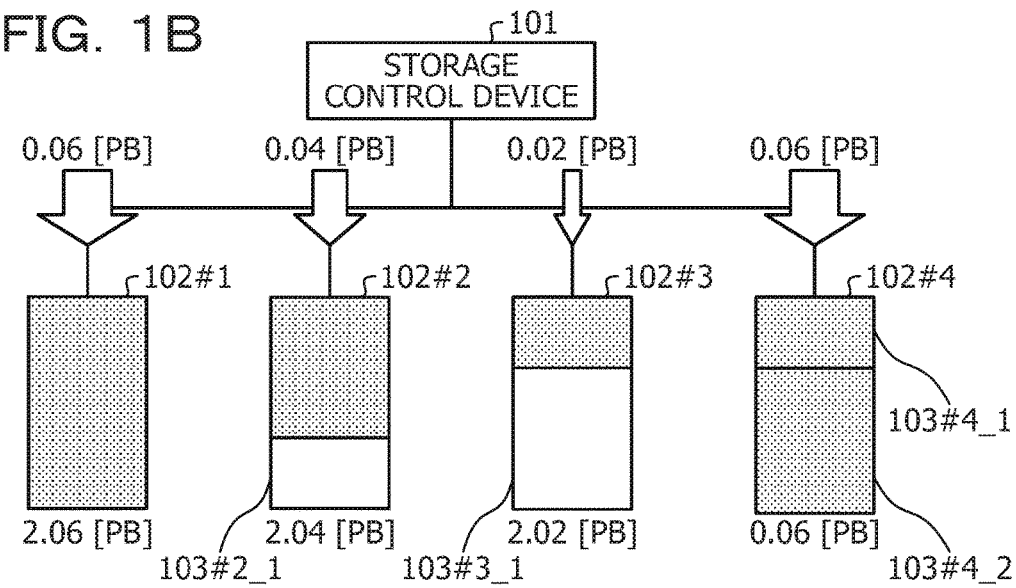

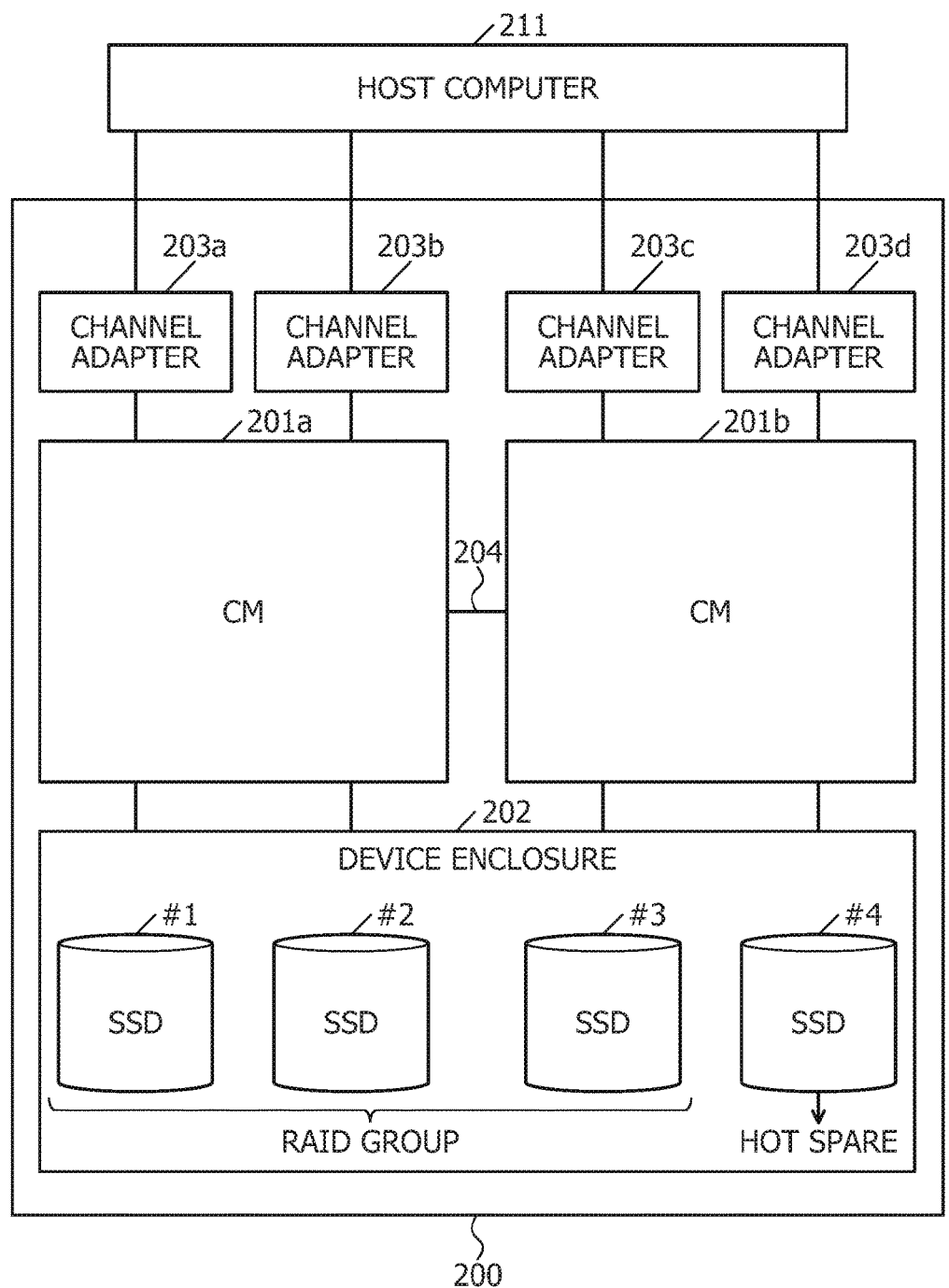

FIG. 6A
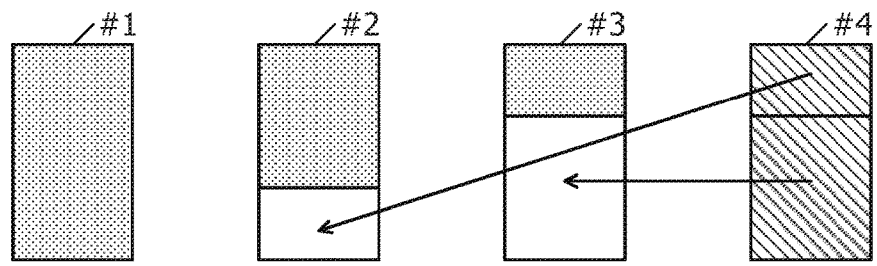
FIG. 6B
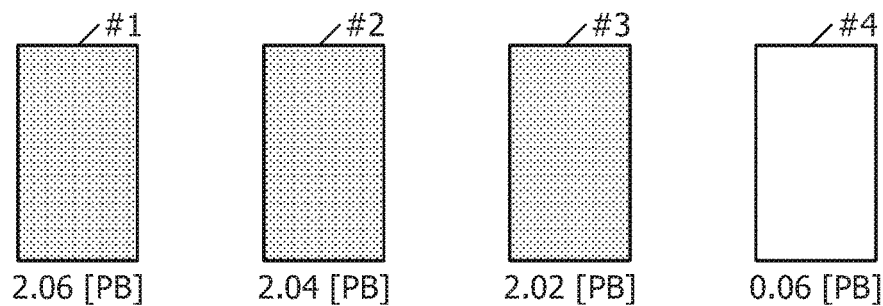

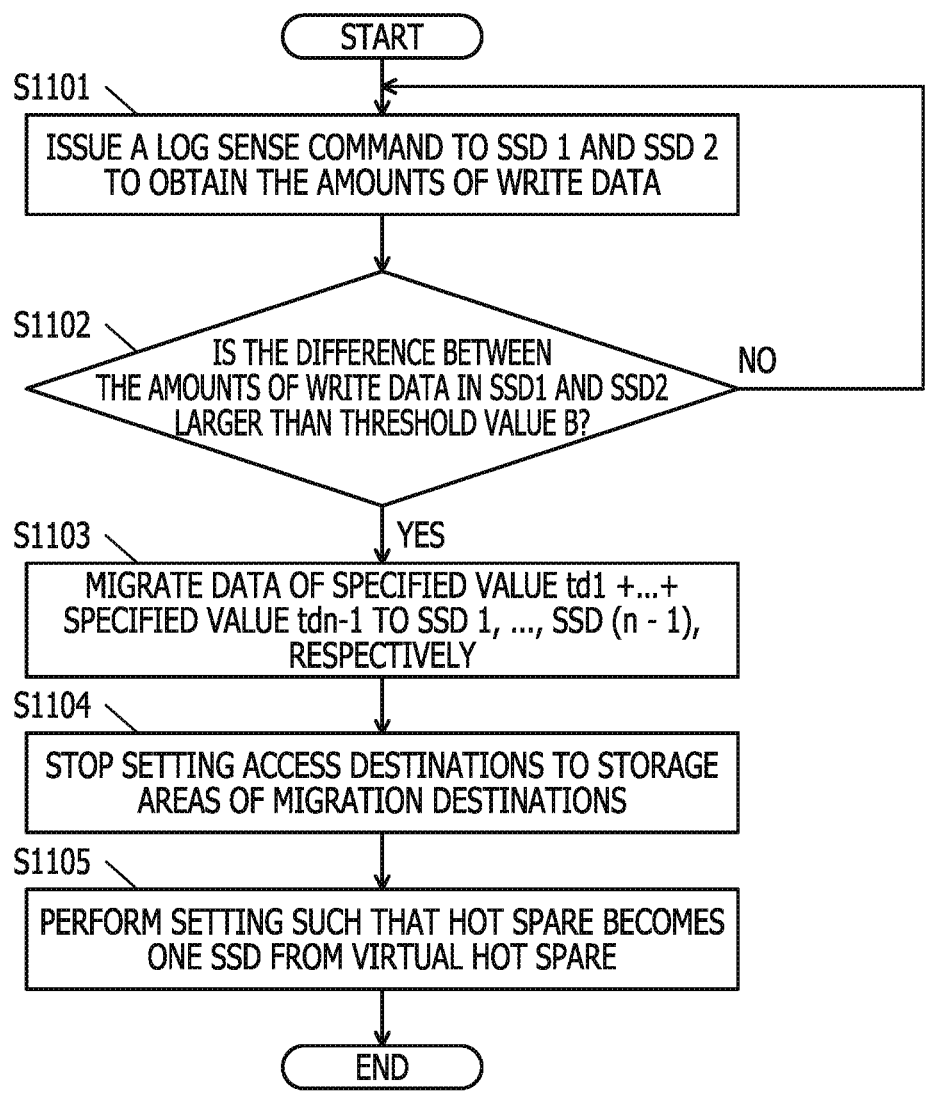

CONTROL DEVICE, STORAGE SYSTEM, AND METHOD OF CONTROLLING A PLURALITY OF STORAGE DEVICES

CROSS-REFERENCE TO RELATED APPLICATION

This application is based upon and claims the benefit of priority of the prior Japanese Patent Application No. 2015-026185, filed on Feb. 13, 2015, the entire contents of which are incorporated herein by reference.

FIELD

The embodiments discussed herein are related to a control device, a storage system, and a method of controlling a plurality of storage devices.

BACKGROUND

To date, the Redundant Arrays of Inexpensive disks (RAID) techniques have been provided in order to operate a plurality of storage devices in combination as a virtual disk. Also, as one of the storage devices that are applicable to the RAID technique, a storage device using a flash memory as a storage medium is provided. In a flash memory, an oxide film that becomes an insulator for each time of writing is deteriorated by penetrating electrons, and thus the flash memory has a number of writable times, which is an upper limit number of writable times. Thus, a storage device using a flash memory as a storage medium has information on the total bytes written (TBW), which indicates the amount of writable data based on the number of writable times.

As a related art technique, for example, a technique is provided in which when data is written into a RAID configuration, the data of one SSD selected from a plurality of solid state drives (SSDs) having a larger number of write times in the RAID configuration than a threshold value is written into a spare disk, and the RAID configuration is reorganized using the spare disk. Also, a technique is provided in which data stored in a second storage medium is copied to a third storage medium such that the difference between the number of write times of a first storage medium and the number of write times of the third storage medium after copying the data in the second storage medium to the third storage medium is larger than the difference between the number of write times of the first storage medium and the number of write times of the second storage medium. As related-art technical literature, Japanese Laid-open Patent Publication Nos. 2013-206151 and 2013-041394 are disclosed.

SUMMARY

According to an aspect of the invention, a control device for controlling a plurality of storage devices, the control device includes a memory, and a processor coupled to the memory and configured to compare a first value with a plurality of amount of data written in the plurality of storage devices, determine whether the amount of data written in a first storage device from the plurality of storage devices is larger than the first value, and whether the amount of data written in a second storage device from the plurality of storage devices is larger than the first value, control a migration of data in a first partial storage area of the first storage device to a second partial storage area of a third storage device included in the plurality of storage devices, change an access destination of access to the first partial storage area to the second partial storage area, control a writing of a first part of first data into a remaining partial storage area other than the first partial storage area of the first storage device, and control a writing of a second part of the first data into the second partial storage area of the third storage device, and control a writing of at least a third part of second data into the second storage device, wherein a data volume of the first part of the first data is different from a data volume of the third part of the second data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A and 1B are explanatory diagrams illustrating an operation example of a storage control device according to the present embodiment;

FIG. 2 is an explanatory diagram illustrating an example of a configuration of a storage system;

FIGS. 6A and 6B are explanatory diagrams illustrating an example of releasing a virtual hot spare;

FIG. 11 is a flowchart illustrating an example of a virtual hot spare release processing procedure.

DESCRIPTION OF EMBODIMENTS

Figure 3:
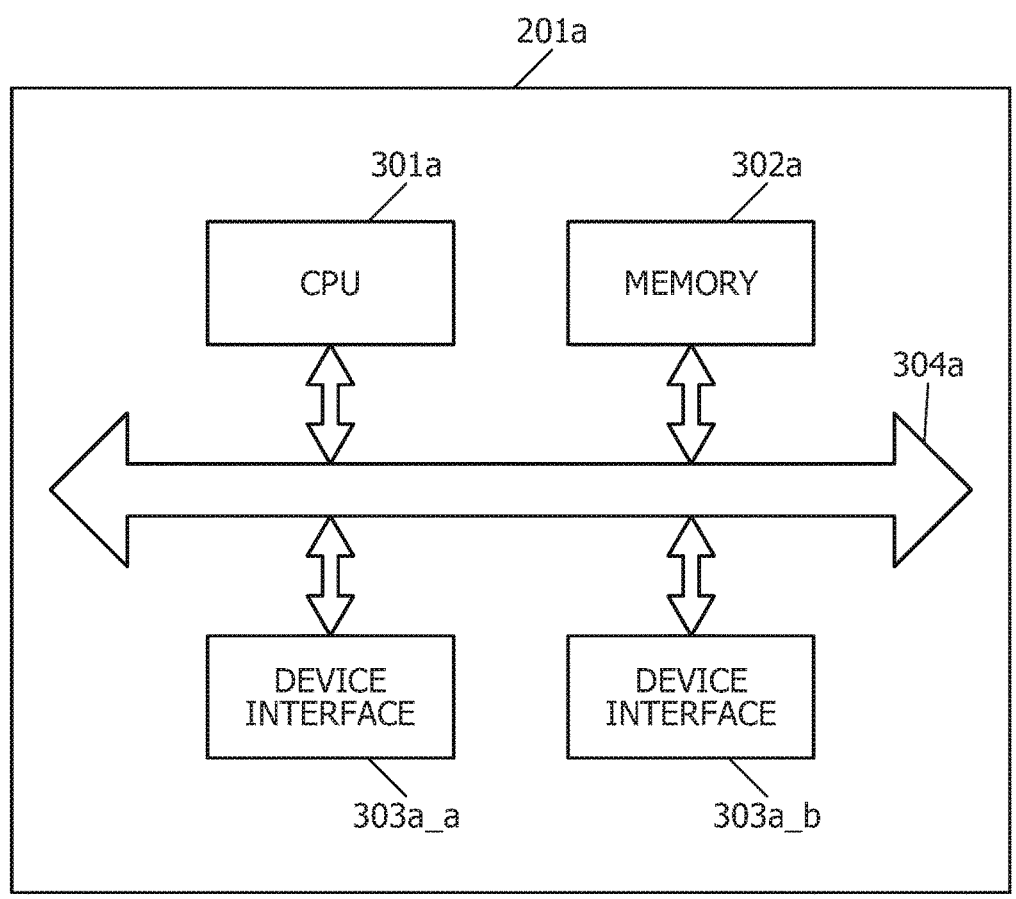
FIG. 3 is a block diagram illustrating an example of a hardware configuration of a CM.

According to a related art technique, the amounts of write data of a plurality of storage devices included in a RAID group formed by storage devices using a flash memory as a storage medium might reach the amounts of writable data at the same time. For example, when a RAID group includes three storage devices, even if data of a certain storage device is migrated to another device that is not included in the RAID group, the amounts of write data of the two remaining storage devices sometimes reach the writable amounts of data at the same time.

According to an embodiment of the present disclosure, it is desirable to provide a storage control device, a storage system, and a control program that are capable of inhibiting the amounts of write data of a plurality of storage devices having a flash memory included in a RAID group as a storage medium from reaching the amounts of writable data at the same time.

FIGS. 1A and 1B are explanatory diagrams illustrating an operation example of a storage control device 101 according to the present embodiment. The storage control device 101 is a computer that controls a plurality of storage devices 102#1 to 102#3, and a storage device 10244 having a flash memory as a storage medium. Specifically, for example, the storage control device 101 forms a RAID group based on the RAID technique using the storage devices 102#1 to 102#3, and a hot spare using the storage device 102#4 as a spare storage device.

The RAID technique is a technique for operating a plurality of storage devices in combination as a virtual disk. The storage control device 101 forms one virtual disk by the storage devices included in a RAID group using the RAID technique. Here, RAID provides RAID levels that represent how to form a virtual disk. For the RAID levels, the RAID levels from RAID 0 to RAID 6 are provided. Also, RAID provides a plurality of RAID levels in combination, such as RAID 0+1. Here, in particular, the RAID levels 5 and 6 are designed such that the amounts of write data of the storage devices included in the RAID group becomes even.

The storage devices 102#1 to 102#3 are storage devices using a flash memory as a storage medium. Specifically, there are, for example, NOR-type flash memories and NAND-type flash memories in flash memories. In a flash memory, an oxide film that becomes an insulator for each time of writing is deteriorated by penetrating electrons, and thus the flash memory has a number of writable times. Here, the number of writable times is an upper limit number of writable times. Thus, a flash memory has indexes, such as TBW that indicates the amount of writable data based on the number of writable times within the warranty period, and drive write per day (DWPD) that indicates how many times the own capacity of data is allowed to be written in one day. Also, the storage device 102#4 may be a storage device using a flash memory as a storage medium, or may be a hard disk drive (HDD), or the like as another storage device.

Here, when a RAID group is formed by storage devices using a flash memory as a storage medium, the amounts of write data of a plurality of storage devices might reach the amount of writable data at the same time. Here, it is thought that the data of one of the plurality of storage devices having the amount of write data lager than a threshold value that is lower than the amount of writable data is migrated to another storage device. However, in this case, if the number of the plurality of storage devices having the amounts of write data lager than a threshold value that is lower than the amount of writable data is three or more, the amounts of write data of the remaining storage devices whose data has not been migrated sometimes reach the amount of writable data at the same time.

Then if the amounts of write data of the plurality of storage devices reach the amount of writable data at the same time, unless the same number of hot spares as the plurality of storage device are provided, it becomes difficult to continue the operation. Also, if one storage device of a RAID group of RAID 5 reaches the amount of writable data, it is possible to write data in a state having no redundancy. However, if two storage devices of more reach the amounts of writable data, it becomes difficult to write data.

Thus, in the storage control device 101, the data of a part of the storage areas having different storage capacities among the plurality of storage devices having the amount of write data larger than a threshold value that is less than the amount of writable data in a RAID group is migrated to the storage device 102#4, and the migration destination is determined to be an access destination. Thereby, in the storage control device 101, a difference arises among the amounts of write data among the storage devices 102#1 to 102#3, and thus it is possible to inhibit the amounts of write data of the two storage devices or more among the storage devices 102#1 to 102#3 from reaching the amount of writable data at the same time.

A description will be given of operation of the storage control device 101 using FIGS. 1A and 1B. In FIG. 1A, the storage control device 101 forms a RAID group by the storage devices 102#1 to 102#3. For the sake of simplification of the description, it is assumed that the storage capacities of the storage devices 102#1 to 102#4 are all the same. Then in a state of FIG. 1A, it is assumed that the amounts of write data of the storage devices 102#1 to 102#3 are individually 2 [PB: PetaByte]. Also, it is assumed that the amount of write data of the storage device 102#4, which is a hot spare, is 0 [PB].

In this state, the storage control device 101 identifies a plurality of storage devices having the amount of write data lager than a threshold value of the amount of data identified from the number of writable times of the flash memory from the RAID group. The storage control device 101 sets a threshold value of the amount of data identified from the number of writable times of the flash memory in TBW, for example. In the following, the threshold value of the amount of data identified from the number of writable times of a flash memory is called a "threshold value A".

In the example in FIG. 1A, it is assumed that the plurality of storage devices having the amount of write data larger than the threshold value A are the storage devices 102#1 to 102#3. In this case, the storage control device 101 may identify the storage devices 102#1 to 102#3 as the plurality of storage device, or may identify two of the storage devices that is less than the number of the storage devices having the amount of write data larger than the threshold value A among the storage devices 102#1 to 102#3. In the example in FIG. 1A, the storage control device 101 identifies the storage devices 102#2 and 102#3.

Next, the storage control device 101 migrates the data of a part of the storage areas of the individual storage devices having different storage capacities among the individual storage devices of the identified plurality of storage devices to a storage area of the storage device 102#4 not included in the RAID group. In the example in FIG. 1A, the storage control device 101 determines a storage area 103#2_1, which is a part of the storage device 102#2, and a storage area 103#3_1, which is a part of the storage device 102#3, to be the storage areas of the migration sources as a part of the storage area.

Here, the storage area 103#2_1 and the storage area 103#3_1 have different storage capacities. Then the total storage capacity of the storage area 103#2_1 and the storage area 103#3_1 is determined to be less than or equal to the storage capacity of the storage device 102#4. For example, it is assumed that the storage capacity of the storage area 103#2_1 is one third that of the storage device 102#2, and the storage capacity of the storage area 103#3_1 is two thirds that of the storage device 102#3.

In the example in FIG. 1A, the storage control device 101 migrates the data of the storage area 103#2_1 and the storage area 103#3_1 to a storage area 103#4_1 and a storage area 103#4_2 of the storage device 102#4, respectively. Here, as a specific migration method, the storage control device 101 copies the data of the storage area 103#2_1 and the storage area 103#3_1 to the storage area 103#4_1 and the storage area 103#4_2, respectively. Then the storage control device 101 may physically delete the data of the storage area 103#2_1 and the storage area 103#3_1, which become the migration sources, or may leave the data because the data is not referenced.

Then the storage control device 101 sets the access destination of access to a part of the storage area to the storage area of the migration destination to which the data of the part of the storage area has been migrated. In the example in FIG. 1A, the storage control device 101 sets the access destination of access to the storage area 103#2_1 to the storage area 103#4_1, and sets the access destination of access to the storage area 103#3_1 to the storage area 103#4_2.

As a more specific method of setting the access destination, for example, the storage control device 101 sets the storage area other than the storage area 103#2_1 of the storage device 102#2 and the storage area 103#4_1 to one virtual storage device. By setting the virtual storage device, the storage control device 101 sets the access destination of access to the storage area 103#2_1 to the storage area 103#4_1. In the same manner, the storage control device 101 sets the storage area other than the storage area 103#3_1 of the storage device 102#3 and the storage area 103#4_2 to one virtual storage device. Then the storage control device 101 reorganize the RAID group with the storage device 102#1 and the two virtual storage devices.

Alternatively, as an example of not setting a virtual storage device, the storage control device 101 may set so as to access the storage area of the migration destination each time access occurs to the storage area of the migration source. For example, it is assumed that access to the storage area 103#2_1 occurs. In this case, the storage control device 101 sets the storage device of the access destination to the storage device 102#4, and sets the address of the access destination to the value decreased by the storage capacity of the storage area other than the storage area 103#2_1 of the storage device 102#2.

FIG. 1B illustrates a state in which after the access destination had been set, the storage control device 101 received writing of 0.06*3 [PB] for the virtual volume of the RAID group. Here, it is assumed that the writing destination of 0.06*3 [PB] is distributed to each of the storage devices 102#1 to 102#3 before migration by 0.06 [PB] for each device.

In FIG. 1B, the storage device 102#1 has not been subjected to migration of a part of the storage area, and thus 0.06 [PB] is newly written thereto. Accordingly, the amount of write data of the storage device 102#1 becomes 2.06 [PB]. Also, one third of the total data of the storage device 102#2 was migrated to the storage device 102#4, and thus 0.06*(1−⅓)=0.04 [PB] is newly written thereto. Accordingly, the amount of write data of the storage device 102#2 becomes 2.04 [PB]. Also, two thirds of the total data of the storage device 102#3 has been migrated to the storage device 102#4, and thus 0.06*(1−⅔)=0.02 [PB] is newly written thereto. Accordingly, the amount of write data of the storage device 102#3 becomes 2.02 [PB].

Also, the amount of write data of the storage device 102#4 becomes 0.06 [PB] that is the sum of the amounts of write data of 0.02 [PB] and 0.04 [PB], which ought to be originally written into the storage devices 102#2 and 102#3, respectively. In this manner, the write data in the storage devices 102#1 to 102#3 have differences in the amount of write data by 0.02 [PB] with one another. Accordingly, it is possible for the storage control device 101 to inhibit the storage devices 102#1 to 102#3 from reaching the amounts of writable data at the same time. Next, a description will be given of the example in which the storage control device 101 is applied to the control device of the storage system using FIG. 2.

FIG. 2 is an explanatory diagram illustrating an example of a configuration of a storage system 200. The storage system 200 includes controller modules (CMs) 201a and 201b, channel adapters 203a to 203d which perform coupling control between the CMs 201a and 201b, and a host computer 211, and a device enclosure 202. The CMs 201a and 201b illustrated in FIG. 2 correspond to the storage control device 101 illustrated in FIGS. 1A and 1B.

The storage system 200 inputs data from and outputs data to a plurality of built-in storage devices. The storage system 200 has a RAID function, such as RAID 1 to 6, or the like, and forms a RAID by putting together a plurality of storage devices so as to manage each RAID as one unit of the storage device.

The CMs 201a and 201b control the entire storage system 200. Also, the CM 201a and the CM 201b are coupled with a bus 204. Control information and data are communicated between the CM 201a and the CM 201b through the bus 204.

The host computer 211 is a computer that executes operation processing, and is coupled to the storage system 200 in a manner allowing data communication through the Storage Area Network (SAN) formed by Fibre Channel. Regarding data used for operation processing, the host computer 211 saves the data into and reads the data from the storage system 200.

The device enclosure 202 includes SSDs #1 to #4 and a plurality of other storage devices not illustrated in FIG. 2 as storage devices. A RAID group is generated by the plurality of storage devices in the device enclosure 202. The RAID group is a logical storage area using the RAID technique. In the following description, for the sake of simplification of the description, it is assumed that the SSDs #1 to #3 constitute a RAID group of RAID 5, and the SSD #4 is a hot spare of the SSDs #1 to #3. Accordingly, the SSDs #1 to #3 correspond to the storage devices 102#1 to 102#3 illustrated in FIGS. 1A and 1B. Then the SSD#4 corresponds to the storage device 102#4 illustrated in FIGS. 1A and 1B.

The SSDs #1 to #4 are SSDs capable of constituting a RAID. Also, the SSD#4 and the other storage devices included in the device enclosure 202 may use a storage medium using a flash memory other than an SSD. For example, the other storage devices included in the device enclosure 202 may use a storage medium using a nonvolatile semiconductor memory other than a flash memory, such as Electrically Erasable Programmable Read-Only Memory (EEPROM), or the like. The other storage devices included in the SSD#4 and the device enclosure 202 may be an HDD that stores data on a magnetic storage medium.

The channel adapters 203a to 203d perform coupling control between the host computer 211, and the CMs 201a and 201b. For example, the channel adapter 203a receives a request from the host computer 211, and performs coupling control with the CM 201a. The CMs 201a and 201b are allowed to be individually coupled with a plurality of (individually two units in FIG. 2) channel adapters 203a to 203d. That is to say, for example, the CM 201a is individually coupled with the two different channel adapters 203a and 203b in order to achieve a redundant configuration.

In this regard, the communications between the channel adapters 203a to 203d, and the host computer 211 are coupled through the SAN formed by Fibre Channel. However, a coupling method other than Fibre Channel may be employed. Also, the storage system 200 may be installed at a remote site from the host computer 211 through the communications between the channel adapters 203a to 203d, and the host computer 211 using a dedicated line or a virtual private network (VPN).

In this regard, the two units, namely the CMs 201a and 201b are illustrated in FIG. 2, and two of the channel adapters 203a to 203d are illustrated for the CMs 201a and 201b, respectively. However, any number of the channel adapters may be employed. Also, only one unit of the device enclosure 202 is illustrated in FIG. 2, but any number of device enclosures may be installed.

FIG. 3 is a block diagram illustrating an example of a hardware configuration of the CM 201a. The CM 201a includes a central processing unit (CPU) 301a, a memory 302a, and a device interfaces 303a_a and 303a_b. The CPU 301a to device interface 303a_b are individually coupled through the bus 304a.

The CPU 301a executes processing in accordance with an operating system (OS), or the like, and performs various kinds of control. Also, the CM 201a performs resource management of the memory 302a, the SSDs #1 to #4 and the other storage devices included in the device enclosure 202, the channel adapters 203a to 203d, and the like.

The memory 302a stores control data used when the CPU 301a controls the storage system 200. Also, the memory 302a temporarily stores input and output data read and written by the individual storage devices included in the device enclosure 202.

The device interfaces 303a_a and 303a_b perform coupling control with the individual storage devices included in the device enclosure 202. Also, the CMs 201a and 201b function as control devices, and are detachable from the storage system 200. Here, the CM 201b has the same configuration as that of the CM 201a, and thus the description thereof will be omitted.

Figure 4:
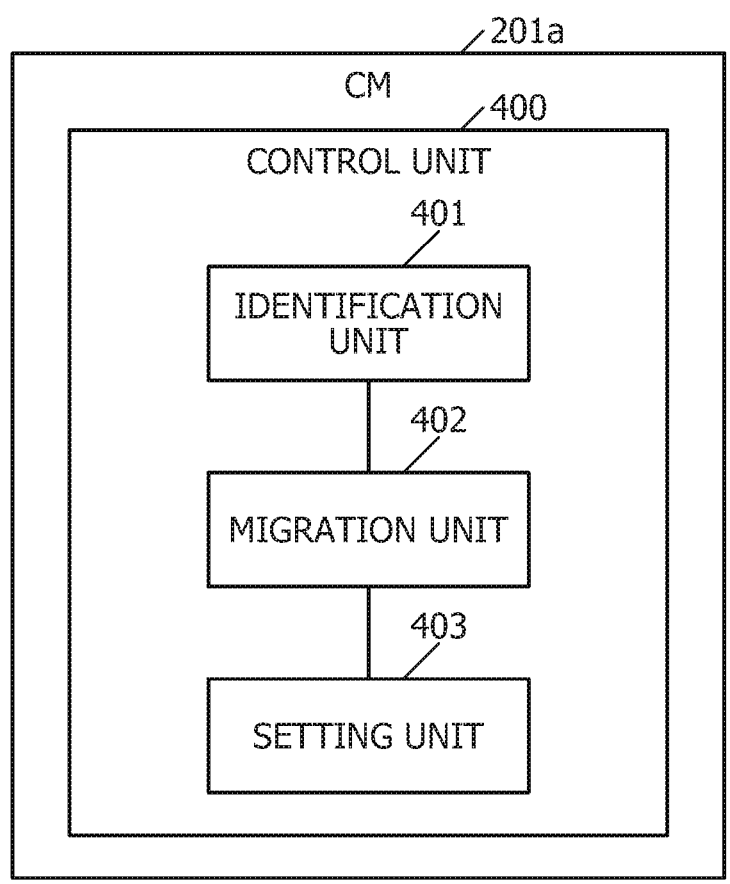
FIG. 4 is a block diagram illustrating an example of a functional configuration of the CM.

FIG. 4 is a block diagram illustrating an example of a functional configuration of the CM 201a. The CM 201a includes a control unit 400. Then the control unit 400 includes an identification unit 401, a migration unit 402, and a setting unit 403. In the control unit 400, the CPU 301 executes the program stored in the storage device so as to achieve the functions of each unit. The storage device is specifically a memory 302 illustrated in FIG. 3, or the like, for example. Also, the processing result of each unit is stored in the memory 302, the registers of the CPU 301, a cache memory of the CPU 301, or the like. Also, the control unit 400 is a function included in the CM 201a in FIG. 4, but may be a function included in the CM 201b, which is executed by the CPU of the CM 201b.

Also, although not illustrated in FIG. 4, the CM 201a is allowed to access a management table. The management table stores TBW of each SSD. Also, the management table stores identification information that indicates whether each SSD is in the process of making the amount of write data uneven or not.

The identification unit 401 identifies a plurality of SSDs having the amount of write data larger than the threshold value A from the RAID group. Also, the identification unit 401 may identify a plurality of SSDs, which are a smaller number of SSDs than the number of the SSDs having the amount of write data larger than the threshold value A, out of the SSDs having the amount of write data larger than the threshold value A. For example, if the number of the SSDs having the amount of write data larger than the threshold value A is n, the identification unit 101 identifies (n−1) units, which is two or more units, of SSDs as a plurality of SSDs out of the SSDs having the amount of write data larger than the threshold value A.

The migration unit 402 migrates data of a part of the storage area of the individual SSDs having different storage capacities among the individual SSDs out of the plurality of SSDs identified by the identification unit 401 to the storage area of a hot spare not included in the RAID group. It is preferable that the storage capacities of the part of the storage areas are separated as far as possible among the individual SSDs.

For example, it is assumed that the identification unit 401 identifies two SSDs as a plurality of SSDs. Then it is assumed that the maximum storage capacity allowed to be migrated is the storage capacity of a hot spare. In this case, the migration unit 402 determines the storage capacity of the storage area to be the migration source of the first SSD to be one third the storage capacity of the hot spare, and determines the storage capacity of the storage area to become the migration source of the second SSD to be two thirds the storage capacity of the hot spare. In this case, it is possible to make a difference of the product of the amount of original write data and one third the storage capacity of the hot spare between write data of the first SSD and the second SSD.

Also, it is assumed that the identification unit 401 has identified three SSDs as a plurality of SSDs. Then it is assumed that the maximum storage capacity allowed to be migrated is the storage capacity of the hot spare. In this case, the migration unit 402 determines the storage capacity of the storage area that becomes the migration source of the first SSD to be one sixth the storage capacity of the hot spare, and determines the storage capacity of the storage area that becomes the second SSD to be two sixths the storage capacity of the hot spare. Further, the migration unit 402 determines the storage capacity of the storage area that becomes the third SSD to be three sixths the storage capacity of the hot spare. In this case, it is possible to make a difference of the product of the amount of original write data and one sixth the storage capacity of the hot spare between the first SSD and the second SSD, and between the second SSD and the third SSD.

Based on the above, it is assumed that the identification unit 401 has identified k units of SSDs as a plurality of SSDs. Then it is assumed that the maximum storage capacity allowed to be migrated is the storage capacity of the hot spare. In this case, the migration unit 402 determines the storage capacity of the storage area to become the migration source of the i-th SSD out of 1st to the k-th SSDs to be the storage capacity of the hot spare multiplied by $i/(1+ \ldots +k)$. In the following description, the storage capacity of the storage area that becomes the migration source of the i-th SSD is described as a specified value $td_i$.

Also, if the storage capacities of a part of the storage areas of the individual SSDs identified by the identification unit 401 out of a plurality of SSDs are different, and the data satisfies the two conditions described in the following, the migration unit 402 may migrate the data to the storage area of the hot spare. The first condition is that the data of a part of the storage area of the individual SSDs of the plurality of SSDs does not have a relationship of the data and the parity of the data among the individual SSDs. Then the second condition is that the data of a part of the storage area of the individual SSDs of the plurality of SSDs is not the data that produces the same parity among the individual SSDs.

Here, in order to explain the migration unit 402, a description will be given of the following word in RAID. One data set produced by laterally combining data disposed in SSDs that forms a RAID group is called a "stripe". One stripe includes data and the parity of the data. For example, one stripe of RAID 5, which is formed by three SSDs, includes two pieces of data and the parity produced by XOR operation of the two pieces of data.

Then the migration unit 402 determines data or parity that has a specified value $td_1$ and stored in the first SSD from each stripe to be the data of the storage area of the migration source of the first SSD. Then the migration unit 102 determines data or parity that has a specified value $td_2$ and stored in the second SSD from a stripe other than the stripe included in the data of the storage area of the migration source of the first SSD to be the data of the storage area of the migration source of the second SSD. In this manner, data of a part of the storage area to be migrated is determined from a stripe other than the stripe including the data of a part of the storage area of the SSD that has been already determined so that it is possible to satisfy the two conditions described above.

Also, after the migration unit 402 migrated data of a part of the storage area, if the difference between the amounts of write data of any two SSDs out of a plurality of SSDs becomes larger than a threshold value B, the migration unit 402 may migrate the data of the storage area of the migration destination to a part of the storage area. The threshold value B is a threshold value identified from the number of writable times of the flash memory.

The setting unit 403 sets the access destination of access to a part of the storage area to the storage area of the migration destination to which the data of the part of storage area has been migrated. For the setting method, for example, as describe with reference to FIGS. 1A and 1B, a method of setting to a virtual storage device, and a method of setting so as to access the storage area of the migration destination every time access occurs to the storage area of the migration source are provided.

Also, after the setting unit 403 migrated the data of the storage area of the migration destination to a part of storage area, the setting unit 403 may stop setting the access destination of access to a part of storage area to the storage area of the migration destination. Specifically, when the method of setting to a virtual storage device is carried out, the setting unit 403 releases the virtual storage device, and reorganizes a RAID group using the original storage devices. Also, when the method of setting so as to access the storage area of the migration destination every time access occurs to the storage area of the migration source is carried out, the setting unit 403 stops setting access to the storage area of the migration destination.

Next, with reference to FIGS. 5A, 5B, 5C, 6A, and 6B descriptions will be given of an example in which the amount of write data of the individual SSDs included in a RAID group are made uneven by creating a virtual hot spare, and an example in which the amounts of write data become sufficiently uneven, and thus the created virtual hot spare is released. It is assumed that the SSDs #1 to #4 described with reference to FIGS. 5A, 5B, 5C, 6A, and 6B have the same capacity of 400 [GB], and are the same model with the same write performance for the sake of simplification of the description. Also, in order to simplify the description, it is assumed that the amount of write data to the SSDs #1 to #3 by the host computer 211 are the same among the SSDs #1 to #3.

Also, the processing for making the amounts of write data of the individual SSDs uneven, and the processing for releasing the virtual hot spare may be performed either by the CM 201a or the CM 201b. In this embodiment, a description will be given using an example in which the CM 201a performs the processing. Also, in FIGS. 5A, 5B, 5C, 6A, and 6B, black-painted areas indicate the storage areas used for the RAID, and white-painted areas indicate unused areas.

Figure 5A:
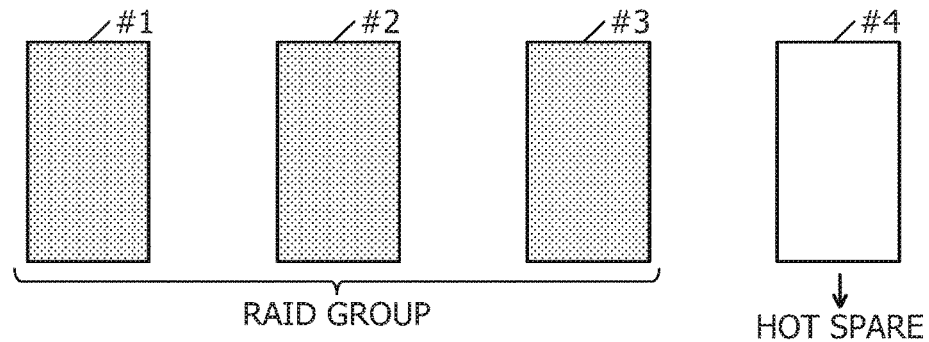
FIGS. 5A, 5B, and 5C are explanatory diagrams illustrating an example of making the amounts of write data in individual SSDs uneven.
Figure 5B:
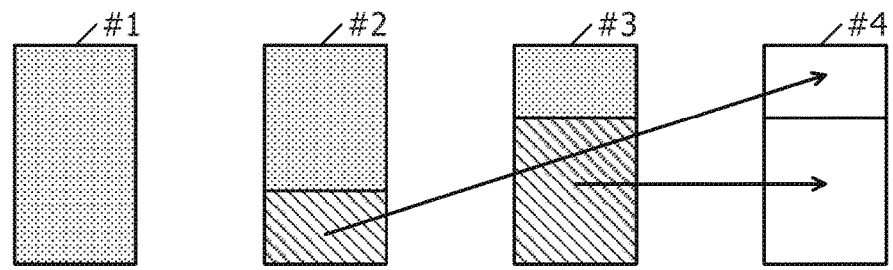
Figure 5C:
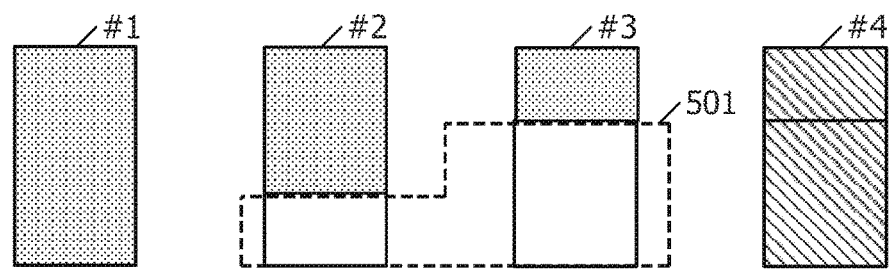

FIGS. 5A, 5B, and 5C are explanatory diagrams illustrating an example of making the amounts of write data of the individual SSDs uneven. First, as illustrated in FIG. 5A, the CM 201a forms a RAID group having the RAID level of RAID 5 by the SSDs #1 to #3, and sets the SSD #4 to a hot spare. At this time, the CM 201a transmits an inquiry command to the SSDs #1 to #4 in order to obtain the TBWs of the SSDs #1 to #4, and stores the TBWs in the management table.

Then the CM 201a determines a threshold value A based on the TBWs of the SSDs #1 to #4. For example, the administrator of the storage system 200 decides that two thirds the TBW to be the threshold value A. Then in the example in FIGS. 5A, 5B, and 5C, if all the TBWs of the SSDs #1 to #4 are 3 [PB], the CM 201 determines the threshold value A to be 3*2/3=2 [PB].

Also, the CM 201a determines a threshold value B based on the storage capacities of the SSDs #1 to #4. For example, the administrator of the storage system 200 decides that 50 times the average value of the storage capacities of the individual storage devices forming the RAID group and the storage capacity of the hot spare to be the threshold value B. Then in the example in FIGS. 5A, 5B, and 5C, the CM 201a determines the threshold value B to be 400 (the average value of the storage capacities of the SSDs #1 to #4) multiplied by 50=20000 [GB]=20 [TB].

Next, the CM 201a issues a log sense command to the SSDs #1 to #4 once per day, and compares the obtained amounts of write data of the SSDs #1 to #4 with 2 [PB], which is the threshold value A. In the example in FIGS. 5A, 5B, and 5C, it is assumed that the amounts of write data of the SSDs #1 to #3 became larger than the threshold value A.

Then the CM 201a identifies a plurality of SSDs having the amount of write data larger than the threshold value A. At this time, even if the amounts of write data of all the SSDs included in the RAID group are larger than the threshold value A, the number of the SSDs to be identified is sufficient by (the number of all the SSDs included in the RAID group)−1. In the example in FIG. 5B, the CM 201a identifies the SSDs #2 and #3.

Next, regarding the identified SSDs #2 and #3, the CM 201a migrates data of the storage area having the storage capacity of the specified value $td_1$ of the SSD #2, and data of the storage area having the storage capacity of the specified value $td_2$ of the SSD #3 to the SSD #4, which becomes a hot spare. In the example in FIG. 5B, the CM 201a migrates data of the specified value $td_1$=400*1/3=133.3 [GB] to the beginning storage area of the SSD #4. Then the CM 201a migrates data of the specified value $td_2$=400*2/3=266.7 [GB] to the storage area next to the specified value $td_1$ from the beginning storage area of the SSD #4. In FIG. 5B, hatched areas indicate the storage areas of the migration sources.

Here, at the time of the migration, the storage area of the migration source of the SSD #2 may be any storage area of the SSD #2, and the storage area of the migration source of the SSD #3 may be any storage area of the SSD #3 in the same manner. However, in order not to deteriorate the redundancy among the uneven amount of write data of the individual SSDs, in the data of the storage areas of the individual migration sources of the SSDs #2 and #3, it is desirable that either one of the data is not the parity of the other data, and the both data are not the data that forms the same parity. A description will be given of a specific example of the storage areas of the migration sources of the individual SSDs using FIGS. 7A and 7B.

Then the CM 201a sets the access destination of access to the storage area of the migration source of the SSD #2 and the storage area of the migration source of the SSD #3 to the storage area of the migration destination in the SSD #4. Thereby, the storage system 200 writes one third the amount of write data to the SSD #2, which occurred after the migration, to the SSD #4, and thus the amount of write data to the SSD #2 is reduced to two thirds compared with the amount of write data of before the setting of the access destination to the storage area of the migration destination. In the same manner, the storage system 200 writes two thirds the amount of write data to the SSD #3, which occurred after the migration, to the SSD #4, and thus the amount of write data to the SSD #3 is reduced to one third compared with the amount of write data of before the setting of the access destination to the storage area of the migration destination.

Next, the CM 201a allocates the storage area of the migration source of the SSD #2, and the storage area of the migration source of the SSD #3 as a virtual hot spare. In the example in FIG. 5C, the CM 201a allocates a storage area illustrated by a broken line 501 as a virtual hot spare. Thereby, it is possible for the storage system 200 to restore the data to the virtual hot spare even if a failure occurs in any of the SSDs #1 to #4.

For example, when the SSD #1 fails, the CM 201a is allowed to restore the data of the SSD #1 in the storage area of the virtual hot spare using the data of the SSDs #2 to #4. Also, when the SSD #2 fails, the CM 201a is allowed to restore the data of the SSD #2 in the storage area of the SSD #3 among the storage area of the virtual hot spare using the data of the SSDs #1, #3, and #4. Also, when the SSD #3 fails, the CM 201a is allowed to restore the data of the SSD #3 in the storage area of the SSD #2 among the storage area of the virtual hot spare using the data of the SSDs #1, #2, and #4. Also, when the SSD #4 fails, if the data of the storage area of the migration source satisfies the conditions illustrated in FIGS. 7A and 7B, the CM 201a is allowed to restore the data of the SSD #4 in the storage area of the virtual hot spare using the data of the SSDs #1 to #3.

FIGS. 6A and 6B are explanatory diagrams illustrating an example of releasing a virtual hot spare. The states illustrated in FIGS. 6A and 6B are states in which operation of the storage system 200 is continued after FIG. 5C. The CM 201a periodically issues a log sense command to the SSDs #1 to #3 to obtain the amounts of write data of the SSDs #1 to #3. Then when the SSD #1 has a TBW not greater than 3 [PB], and the difference between the amounts of write data of the SSDs #2 and #3 is greater than the threshold value B of 20 [TB: TeraByte], the CM 201a returns the migrated data to the storage area of the migration source.

In the example illustrated in FIG. 6A, the CM 201a writes the data of the storage area from the beginning of the SSD #4 to the specified value td1 to the storage area allocated as the virtual hot spare of the SSD #2. Next, the CM 201a writes the data of the storage area from the specified value td1 of the SSD #4 to the specified value td$_2$ to the storage area allocated as the virtual hot spare of the SSD #3. Then the CM 201a releases the virtual hot spare, and sets the SSD #4 as a hot spare.

FIG. 6B illustrates an example of a state after the virtual hot spare was released. The amounts of write data of the SSDs #1 to 44 after the virtual hot spare was released are 2.06 [PB], 2.04 [PB], 2.02 [PB], and 0.06 [DB], respectively, and thus the amounts of write data are made uneven.

Figure 7A:
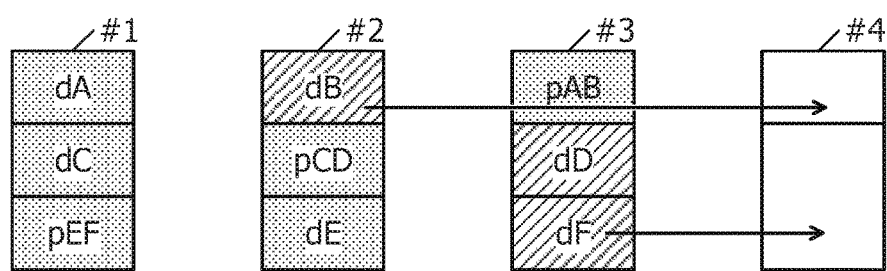
FIGS. 7A and 7B are explanatory diagrams illustrating an example of data to be migrated.
Figure 7B:
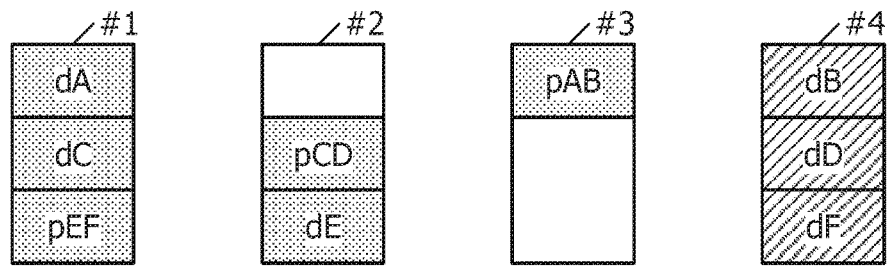

FIGS. 7A and 7B are explanatory diagrams illustrating an example of data to be migrated. In FIGS. 7A and 7B, the SSDs #1 to #3 constitute a RAID group of RAID 5, and the SSD #1 stores data dA and dC, and parity pEF. Also, the SSD #2 stores data dB, parity pCD, and data dE. Also, the SSD #3 stores parity pAB, and data dD and dF. Here, parity pXY is parity of data X and data Y. Then it is assumed that the data dA to dF and the parity pAB, pCD, and pEF are all one third the total storage capacity of the SSD.

Here, when a description is given using stripes with reference to FIG. 4, the data dA and dB, and the parity pAB constitute the same stripe, which is assumed to be a stripe 1. Also, the data dC and dD, and the parity pCD constitute the same stripe, which is assumed to be a stripe 2. Also, the data dE and dF, and the parity pEF constitute the same stripe, which is assumed to be a stripe 3.

In this state, the CM 201a performs setting such that either one of the data of the storage areas of the individual migration sources of the SSDs #2 and #3 is not the parity of the other data, and not the data forming the same parity as the conditions that does not deteriorate redundancy. For example, as illustrated in FIG. 7A, the CM 201a migrates the data dB, which is the data of the storage area of the SSD #2 having the storage capacity of the specified value td$_1$ and included in the stripe 1, to the SSD #4. Further, the CM 201a migrates the data dD, which is the data of the storage area of the SSD #3 having the storage capacity of the specified value td$_2$ and included in the stripe 2, and the dF included in the stripe 3 to the SSD #4.

The migrated result is illustrated in FIG. 7B. Thereby, even if the SSD #4 fails, there are no plurality of the data or parity included in the same stripe in the SSD #4, and thus it is possible to restore the data of the SSD #4 to the virtual hot spare. Specifically, the CM 201a restores the data dB, dD, and dF that are stored in the SSD #4 using the data dA, dC, and dE, and the parity pAB, pCD, and pEF that are stored in the SSDs #1 to #3. For example, the CM 201a restores the data dB by performing XOR of the data dA and the parity pAB. Also, the CM 201a restores the data dD by performing XOR of the data dC and the parity pCD. Also, the CM 201a restores the data dF by performing XOR of the data dE and the parity pEF.

Next, a description will be given of a flowchart executed by the CM 201a using FIG. 8 to FIG. 11.

Figure 8:
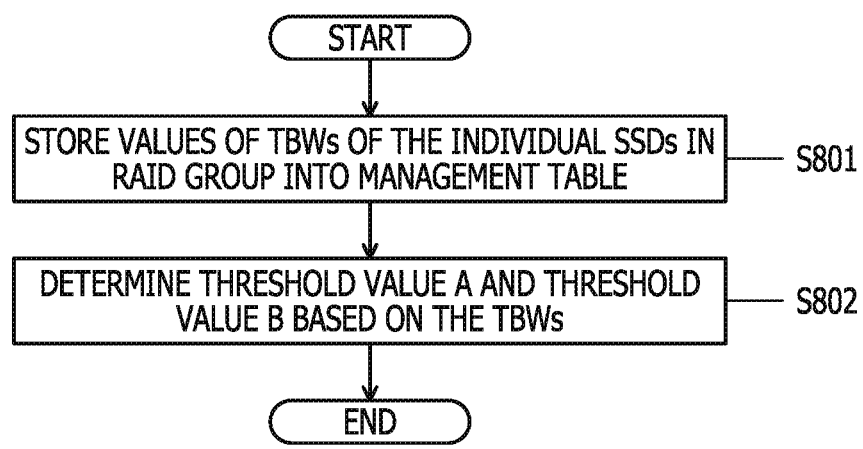
FIG. 8 is a flowchart illustrating an example of a setting processing procedure of threshold values of the amounts of write data in the individual SSDs.

FIG. 8 is a flowchart illustrating an example of a setting processing procedure of the threshold value of the amount of write data in SSD. The setting processing procedure of the threshold value of the amount of write data in SSD is the processing for setting the threshold values A and B. The setting processing procedure of the threshold value of the amount of write data in SSD is the processing that is executed when a plurality of SSDs forms a RAID group.

The CM 201a stores the values of TBWs of the individual SSDs in the RAID group into the management table (step S801). Next, the CM 201a determines a threshold value A and a threshold value B based on the TBWs (step S802). After completion of the processing of step S802, the CM 201a terminates the setting processing procedure of the threshold value of the amount of write data in SSD. By performing the setting processing procedure of the threshold value of the amount of write data in SSD, the CM 201a is allowed to set the threshold values A and B.

Figure 9:
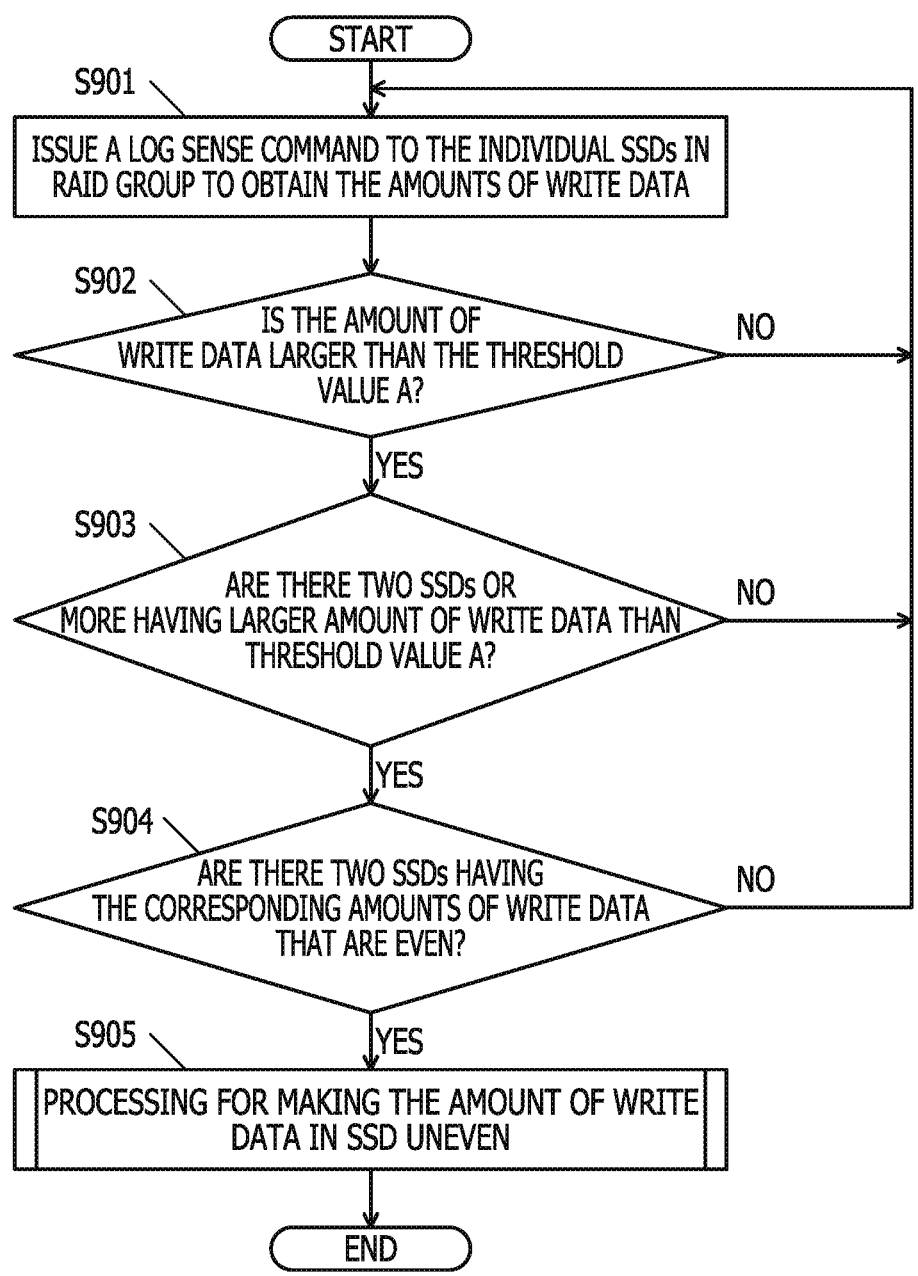
FIG. 9 is a flowchart illustrating an example of a processing procedure of determining whether the amounts of write data in the SSDs are larger than a threshold value.

FIG. 9 is a flowchart illustrating an example of a determination processing procedure of whether the amount of write data in SSD is larger than the threshold value. The determination processing of whether the amount of write data in SSD is larger than the threshold value is processing for determining whether the amount of write data is larger than the threshold value A or not.

The CM 201*a* issues a log sense command to the individual SSDs in the RAID group to obtain the amounts of write data (step S901). Next, the CM 201*a* determines whether the amount of write data is larger than the threshold value A (step S902). If the amount of write data is larger than the threshold value A (step S902: Yes), the CM 201*a* determines whether there are two SSDs or more having a larger amount of write data than the threshold value A (step S903). If there are two SSDs or more having a larger amount of write data than the threshold value A (step S903: Yes), the CM 201*a* determines whether there are SSDs having the corresponding amounts of write data that are even (step S904). If there are the amounts of write data that are even (step S904: Yes), the CM 201*a* performs the processing for making the amounts of write data in the SSDs uneven (step S905). After the processing in step S905, the CM 201*a* terminates the determination processing of whether the amount of write data in SSD is larger than the threshold value.

On the other hand, if the amount of write data is not larger than the threshold value A, or the number of the SSDs having the amount of write data that is larger than the threshold value A is less than two, or the amounts of write data are uneven (steps S902 to S904: No), the processing of the CM 201*a* proceeds to step S901. By performing the determination processing of whether the amount of write data in SSD is larger than the threshold value, it is possible for the CM 201*a* to perform the processing for making the amounts of write data in SSDs uneven when the amounts of write data is larger than the threshold value A.

Figure 10:
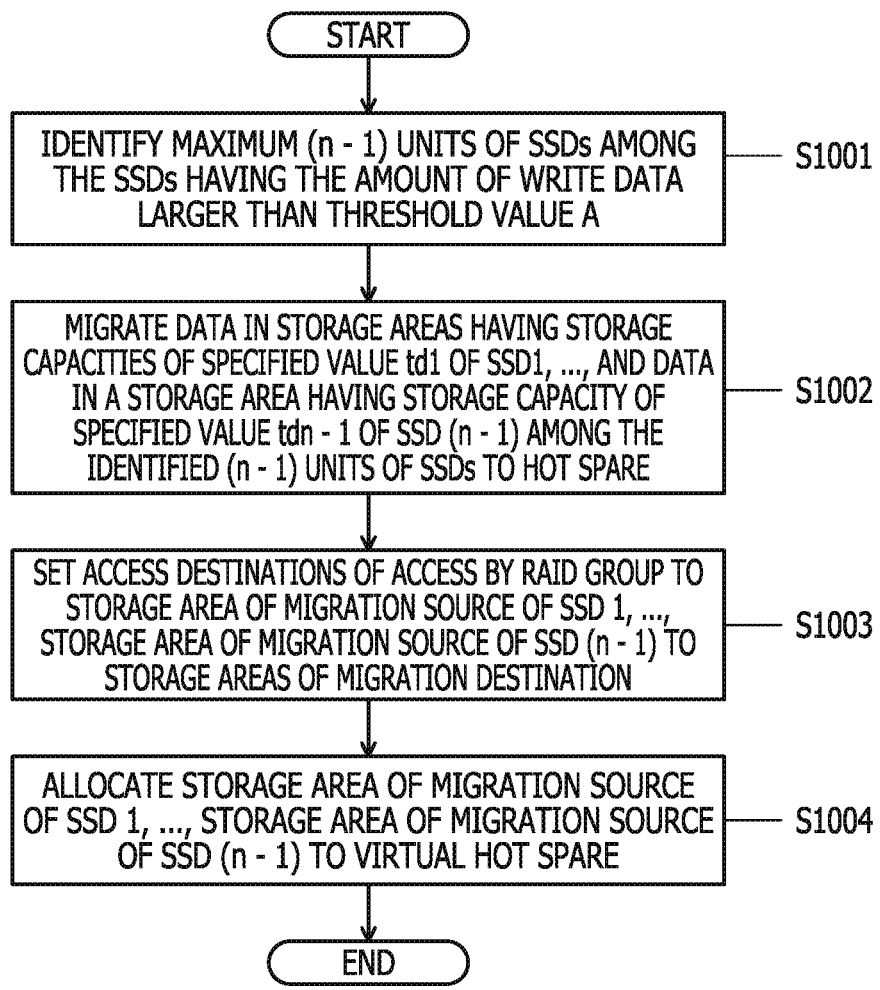
FIG. 10 is a flowchart illustrating an example of a processing procedure of making the amounts of write data in the SSDs uneven.

FIG. 10 is a flowchart illustrating an example of a processing procedure for making the amounts of write data in SSDs uneven. The processing for making the amounts of write data in SSDs uneven is processing for setting the amounts of write data in the individual SSDs uneven.

The CM 201*a* identifies maximum (n−1) units of SSDs among the SSDs having the amount of write data larger than threshold value A (step S1001). Here, the CM 201*a* performs processing of making the amounts of write data in SSDs uneven for the identified SSDs, and thus the CM 201*a* records that processing of making the amounts of write data uneven has been performed on the identified SSDs in the management table.

Next, the CM 201*a* migrates the data in the storage areas having storage capacities of the specified values td (specified value $td_1$ for the SSD1, specified value $td_7$ for the SSD2, . . . , and specified value $td_{n-1}$ for the SSD (n−1)) determined for the corresponding SSDs from the identified (n−1) units of the SSDs (SSD 1, SSD 2, . . . , SSD (n−1)) to the hot spare (step S1002). Then the CM 201*a* sets the access destinations of access by the RAID group to the storage areas of the individual migration sources of the identified (n−1) units of SSDs to the storage areas of the migration destination (step S1003). Next, the CM 201*a* allocates the storage areas of the individual migration sources of the identified (n−1) units of SSDs as the virtual hot spare (step S1004).

After completion of the processing in step S1004, the CM 201*a* terminates the processing for making the amounts of write data in SSDs uneven. By performing the processing for making the amounts of write data in SSDs uneven, and continuing operation of the storage system 200 without change, it is possible for the CM 201*a* to making the amounts of write data in the individual SSDs uneven.

FIG. 11 is an example illustrating a virtual hot spare release processing procedure. The virtual hot spare release processing is processing for releasing a virtual hot spare. First, the CM 201*a* issues a log sense command to the SSD 1 and the SSD 2 to obtain the amounts of write data (step S1101). Here, the CM 201*a* does not have to issue a log sense command to all the SSDs whose data has been migrated, and it is sufficient for the CM 201*a* to issue the log sense command to any two of the storage devices included in the RAID group. If any two SSDs have the amount of write data larger than the threshold value B among the SSDs from which data has been migrated, it is highly possible that the amounts of write data of the other two SSDs among the SSDs from which the data has been migrated are larger than the threshold value B.

Next, the CM 201*a* determines whether the difference between the amounts of write data of the SSD 1 and the SSD 2 is larger than the threshold value B (step S1102). If the difference between the amounts of write data of the SSD 1 and the SSD 2 is not larger than the threshold value B (step S1102: No), the processing of the CM 201*a* proceeds to the processing of step S1101 after a certain period of time.

On the other hand, if the difference between the amounts of write data of the SSD 1 and the SSD 2 becomes larger than the threshold value B (step S1102: Yes), the CM 201*a* migrates data of the total amount ($td_1$+ . . . +$td_{n-1}$) of the specified values of the individual SSDs on the hot spare to the SSD 1, . . . , and the SSD (n−1), correspondingly (step S1103). Then the CM 201*a* stops the setting the access destinations to the storage areas of the migration destinations (step S1104). Next, the CM 201*a* performs setting such that the hot spare becomes one SSD from the virtual hot spare (step S1105). After completion of step S1105, the CM 201*a* terminates the virtual hot spare release processing. By performing the virtual hot spare release processing, it is possible for the CM 201*a* to release the virtual hot spare when the amounts of write data of the individual SSDs are made uneven.

As described above, the CM 201*a* migrates data of a part of the storage areas having different storage capacities among a plurality of SSDs having the amount of write data larger than the threshold value A in a RAID group formed by the SSDs #1 to #3 to the SSD #4, and sets the migration destinations to the access destinations. Thereby, it is possible for the CM 201*a* to make the difference in the amount of write data among the SSDs #1 to #3, and to inhibit the amounts of write data of two SSDs or more among the SSDs #1 to #3 from reaching the amounts of writable data at the same time. Also, the RAID level of the RAID group in this embodiment may be any level of RAID 0 to RAID 6, and may be a level of the combination of a plurality of RAID levels.

Also, the CM 201*a* may identify a smaller plural number of SSDs having the amounts of write data larger than the threshold value A among the SSDs having the amounts of write data larger than the threshold value A. Thereby, it is possible for the CM 201*a* to make a larger difference of amounts of write data of the individual SSDs than the difference of when all the SSDs having the amounts of write data larger than the threshold value A are identified as a plurality of SSDs.

For example, it is assumed that there are three SSDs having the amounts of write data larger than the threshold value A. At this time, if two of the three SSDs are identified as a plurality of SSDs, the CM 201 migrates one third the data of the storage area of the first SSD, and migrates two thirds the data of the storage area of the second SSD. Thereby, among the SSD from which the storage area has not been migrated, the SSD from which one third the storage area has been migrated, and the SSD from which two thirds the storage area has been migrated, differences of one third the amount of write data after migration are made individually.

On the other hand, if all the three SSDs are identified as a plurality of SSDs, the CM 201 migrates one sixth the storage area of the first SSD, migrates two sixths the storage area of the second SSD, and migrates three sixths the storage area of the third SSD. Thereby, among the SSD from which one sixth the storage area has been migrated, the SSD from which two sixths the storage area has been migrated, and the SSD from which three sixths the storage area has been migrated, differences of one sixth the amount of write data after migration are made individually. In this manner, the smaller the number of the identified SSDs, the larger the difference of the amounts of write data is possible after migration.

Also, with the CM 201a, after the data of a part of storage area is migrated, if the difference of the amounts of write data of any two SSDs among a plurality of SSDs is greater than the threshold value B, the setting to migrate the data of the storage area of the migration destination to a part of storage area, and to change the access destination may be stopped. Thereby, the SSDs came to a state having sufficient difference of the amounts of write data of the individual SSDs, and thus the CM 201a does not have to set to change the access destination, and thus it is possible to reduce such a load imposed on the CM 201a.

Also, with the CM 201a, the data of a part of storage areas of the individual SSDs among a plurality of SSDs may have no relationship of data and the parity thereof among the individual SSDs, and the data may not form the same parity among the individual SSDs. Thereby, the migration destination does not include a plurality of data or parity included in the same stripe, and thus it is possible for the CM 201a to maintain redundancy of the RAID group.

In this regard, it is possible to achieve a control method according to this embodiment by executing a program provided in advance on a computer, such as a personal computer, a workstation, or the like. This control program is recorded on a computer-readable recording medium, such as a hard disk, a flexible disk, a compact disc-read only memory (CD-ROM), a digital versatile disk (DVD), or the like, and is read from the recording medium and executed by the computer. Also, this control program may be distributed through a network, such as the Internet, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device for controlling a plurality of storage devices, the control device comprising:
    a memory; and
    a processor coupled to the memory and configured to
        detect that an amount of data written in a first storage device from the plurality of storage devices is larger than a first value, and that the amount of data written in a second storage device from the plurality of storage devices is larger than the first value,
        control a migration of data in a first partial storage area of the first storage device to a second partial storage area of a third storage device included in the plurality of storage devices,
        change an access destination of access to the first partial storage area to the second partial storage area,
        control a writing of a first part of first data into a remaining partial storage area of the first storage device other than the first partial storage area of the first storage device, and control a writing of a second part of the first data into the second partial storage area of the third storage device, and
        control a writing of at least a third part of second data into the second storage device, wherein
    a data volume of the first part of the first data is different from a data volume of the third part of the second data.

2. The control device according to claim 1, wherein the processor is configured to
    control a migration of data in a third partial storage area of the second storage device to a fourth partial storage area of the third storage device,
    change an access destination of access to the third partial storage area to the fourth partial storage area, and
    control a writing a fourth part of the second data into the fourth partial storage area of the third storage device,
    wherein a data volume of the second part of the first data is different from a data volume of the fourth part of the second data.

3. The control device according to claim 2, wherein the processor is configured to
    after data stored in the first partial storage area of the first storage device and data stored in the third partial storage area of the second storage device are migrated to the second partial storage area and the fourth partial storage area, respectively, and when a difference between amounts of write data of the first storage device and the second storage device is larger than a second value, control a migration of data of the second partial storage area and data of the fourth partial storage area to the first partial storage area of the first storage device and the third partial storage area of the second storage device, respectively, and
    change an access destination of access to the second partial storage area to the first partial storage area, and change an access destination of access to the fourth partial storage area to the third partial storage area.

4. The control device according to claim 2,
    wherein data of the first partial storage area and data of the third partial storage area are not in a relationship of data and parity of the data, and are not in a relationship of data forming an identical parity.

5. The control device according to claim 1,
    wherein the first storage device and the second storage device are included in a first redundant arrays of inexpensive disk (RAID) group, and the third storage device is not included in the first RAID group.

6. The control device according to claim 1, wherein the plurality of storage devices include a nonvolatile memory, and the first value is set based on a number of writable times of the nonvolatile memory.

7. The control device according to claim 6,
    wherein the nonvolatile memory is a flash memory.

8. A storage system comprising:
a plurality of storage devices; and
a control device,
wherein the control device including
   a memory, and
   a processor coupled to the memory and configured to
      detect that an amount of data written in a first storage device from the plurality of storage devices is larger than a first value, and that the amount of data written in a second storage device from the plurality of storage devices is larger than the first value,
      control a migration of data in a first partial storage area of the first storage device to a second partial storage area of a third storage device included in the plurality of storage devices,
      change an access destination of access to the first partial storage area to the second partial storage area, and
      control a writing of a first part of first data into a remaining partial storage area of the first storage device other than the first partial storage area of the first storage device, and control a writing of a second part of the first data into the second partial storage area of the third storage device, and control a writing of at least a third part of a second data into the second storage device,
      wherein a data volume on the first part of the first data is different from a data volume of the third part of the second data.

9. A method of controlling a plurality of storage devices, the method comprising:
detecting that an amount of data written in a first storage device from the plurality of storage devices is larger than a first value, and that the amount of data written in a second storage device from the plurality of storage devices is larger than the first value;
migrating data in a first partial storage area of the first storage device to a second partial storage area of a third storage device included in the plurality of storage devices;
changing an access destination of access to the first partial storage area to the second partial storage area;
writing a first part of first data into a remaining partial storage area of the first storage device other than the first partial storage area of the first storage device, and writing a second part of the first data into the second partial storage area of the third storage device; and
writing at least a third part of second data into the second storage device,
wherein a data volume on the first part of the first data is different from a data volume of the third part of the second data.

10. The method according to claim 9, further comprising:
controlling a migration of data in a third partial storage area of the second storage device to a fourth partial storage area of the third storage device;
changing an access destination of access to the third partial storage area to the fourth partial storage area; and
controlling a writing a fourth part of the second data into the fourth partial storage area of the third storage device,
wherein a data volume of the second part of the first data is different from a data volume of the fourth part of the second data.

11. The method according to claim 10, further comprising:
after data stored in the first partial storage area of the first storage device and data stored in the third partial storage area of the second storage device are migrated to the second partial storage area and the fourth partial storage area, respectively, and when a difference between amounts of write data of the first storage device and the second storage device is larger than a second value, controlling a migration of data of the second partial storage area and data of the fourth partial storage area to the first partial storage area of the first storage device and the third partial storage area of the second storage device, respectively; and
changing an access destination of access to the second partial storage area to the first partial storage area, and change an access destination of access to the fourth partial storage area to the third partial storage area.

12. The method according to claim 10,
wherein data of the first partial storage area and data of the third partial storage area are not in a relationship of data and parity of the data, and are not in a relationship of data forming an identical parity.

13. The method according to claim 9,
wherein the first storage device and the second storage device are included in a first redundant arrays of inexpensive disk (RAID) group, and the third storage device is not included in the first RAID group.

14. The method according to claim 9, wherein
the plurality of storage devices include a nonvolatile memory, and
the first value is set based on a number of writable times of the nonvolatile memory.

15. The method according to claim 14,
wherein the nonvolatile memory is a flash memory.

* * * * *